Figure 3:
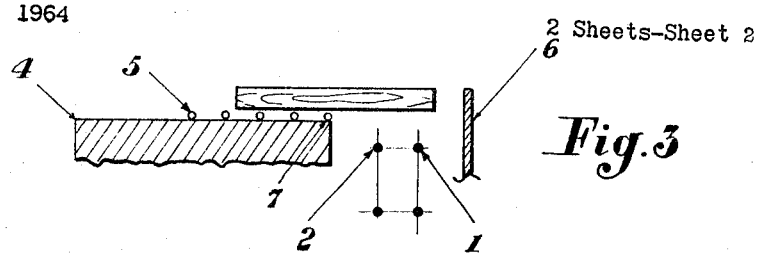

Aug. 9, 1966  G. F. FRANCIOSI  3,265,184
CONVEYING DEVICE FOR ELONGATED MATERIALS
Filed Aug. 13, 1964  2 Sheets-Sheet 1
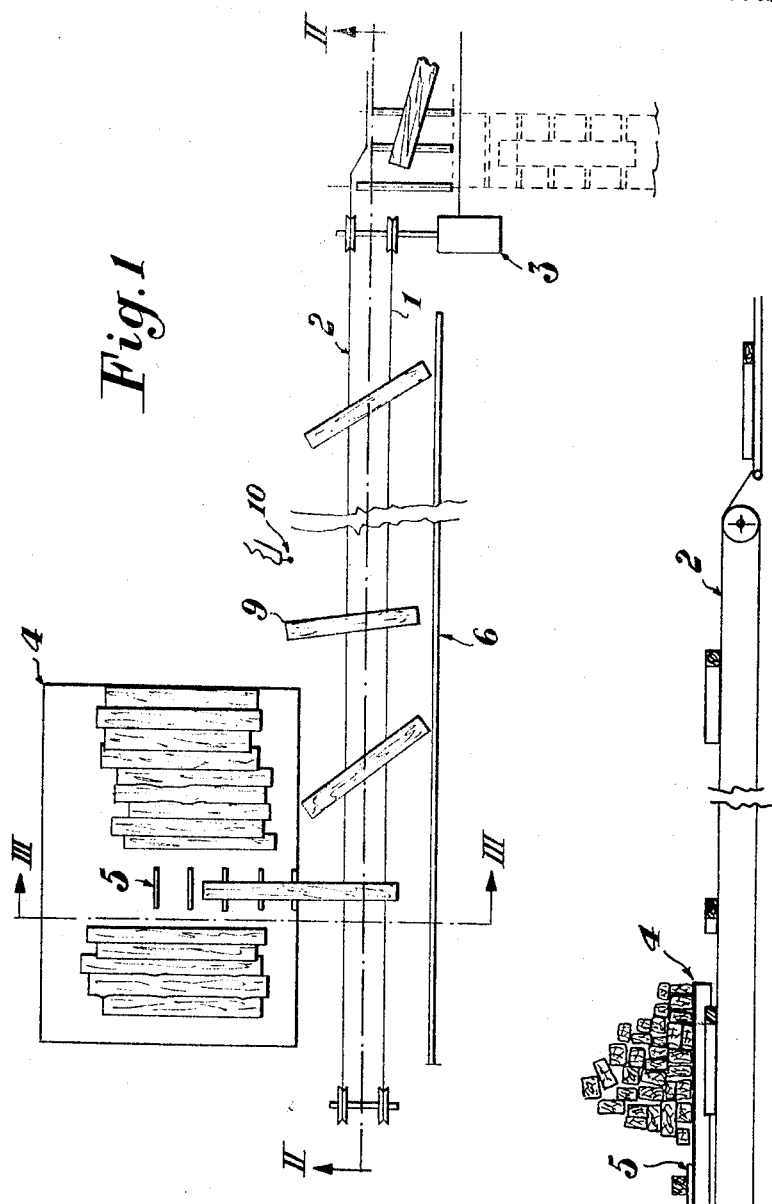

Aug. 9, 1966  G. F. FRANCIOSI  3,265,184
CONVEYING DEVICE FOR ELONGATED MATERIALS
Filed Aug. 13, 1964  2 Sheets-Sheet 2

United States Patent Office 3,265,184
Patented August 9, 1966

3,265,184
CONVEYING DEVICE FOR ELONGATED
MATERIALS
Giovanni F. Franciosi, 9 Via Posillipo, Naples, Italy
Filed Aug. 13, 1964, Ser. No. 389,297
Claims priority, application Italy, Aug. 26, 1963,
17,574/63
3 Claims. (Cl. 198—33)

The present invention relates to a power operated conveyor which not only serves as a conventional conveyor for the remote conveyance of materials, but is adapted for being easily loaded and unloaded. This conveyor also, due to its construction, is particularly suitable for sorting the conveyed material into two and subsequently advancing the sorted material to secondary conveyors or storage zones. The conveyor is preferably used with solid materials having an elongated shape, and as it will be disclosed later on, having a length not greatly dissimilar from one another. For instance, this device is particularly suitable for discharging, conveying and sorting timber in the form of ties, planks and round timber. The conveyor consists substantially of two suitably supported parallel ropes or chains, which move in a horizontal plane at a level lower than that of the plane wherefrom the material is fed, said plane being termed hereinafter the "loading platform."

The pieces of material move lengthwise on said loading plane, either by being pushed manually or by gravity, or by mechanical means, at a particular instant, the center of gravity of the piece will extend beyond the edge of said platform. At such instant, the piece of material will start tilting downwards and its end will move along an arc of a circle until it meets one of the two chains of the conveyor, whereon it will rest with a portion of its weight. The chain of the conveyor which moves along a path which is approximately at right angles with respect to the direction of original movement of the piece of material, will help said piece to be extracted from the loading platform, until the rear portion of said piece will also leave said platform and drop onto the second chain which is located between said first chain and the loading platform. From this moment on, the piece will travel, resting on two chains of the conveyor, in a direction which is approximately at right angles with respect to its initial direction of movement, and the piece of material itself will be oriented in a position which is somewhere between the parallel and perpendicular positions with respect to the chain.

Figure 4:
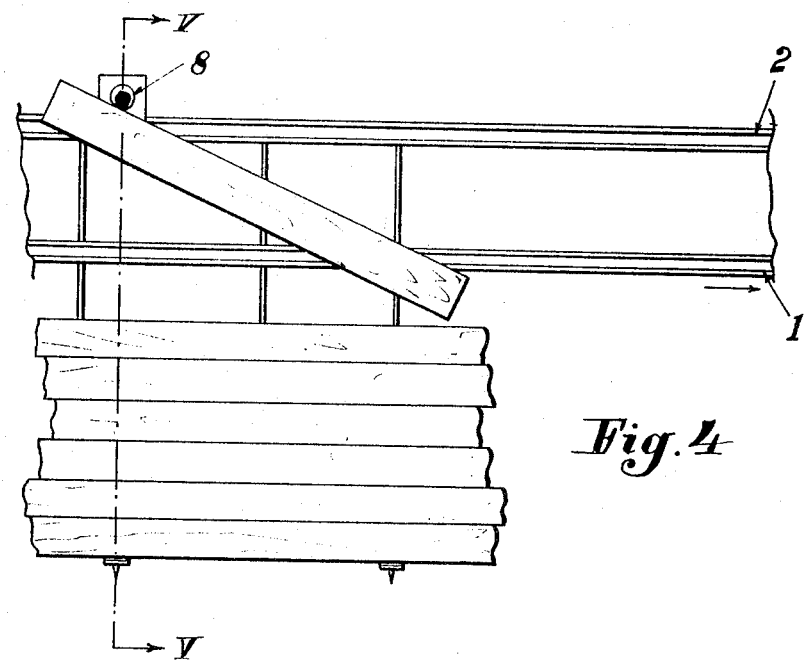
Figure 5:
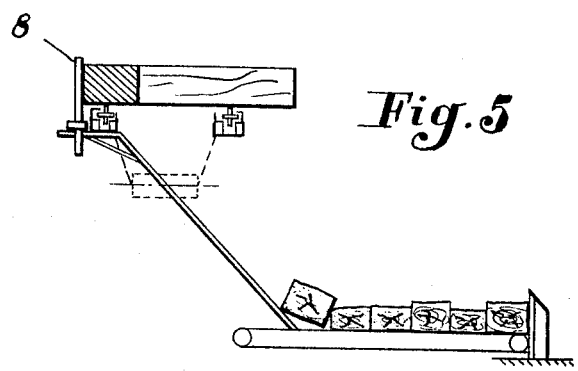

The structure of the conveyor and its arrangement with respect to the loading platform are related to the length of the pieces of material to be conveyed and this will be illustrated by the description of several embodiments of this invention, which will be described by way of non limitative example and with reference to the attached drawings wherein:

FIG. 1 is a diagrammatic plan view of the conveyor according to the present invention;
FIG. 2 is a longitudinal sectional view, in side elevation as taken along line II—II of FIG. 1;
FIG. 3 is a cross sectional view taken along line III—III of FIG. 1;
FIG. 4 is a plan view of another embodiment of the conveyor according to the present invention;
FIG. 5 is a vertical cross sectional view taken along line V—V of FIGURE 4.

With reference to the drawings, an embodiment of the conveyor according to this invention as shown in FIG. 1 shows only by way of non limitative example the arrangement to be used for loading wood ties or timbers on the conveyor. In FIG. 1 two chains 1 and 2 of the conveyor are shown in plan view, said chains travelling in the direction of the arrow, each chain being endless and moving about a front pulley and a rear pulley. The upper run of the chain between the terminal pulleys is suitably supported. The two end pulleys are connected to a prime mover 3 which operates the movement of the conveyor. On a loading platform 4 are shown timbers located random on said platform on both sides of an idle roller conveyor 5.

Only one loading platform has been shown in FIG. 1, but two or more platforms can be employed, there being no limitative factors due to a compulsory location of the discharge along the conveyor.

The timbers on the loading platform are caused to glide or to fall onto the roller conveyor 5 and are then pushed towards the conveyor. In FIG. 3 a timber has been shown, about one half of which projects from the loading platform whereby when the forward movement of the timber continues, the projecting portion of the timber will move along an arc and its end will fall onto the chain 1. The rear portion of this timber will rotate about a pivot point formed by the last roller 7 of the roller conveyor 5.

As the chain 1 moves and as part of the timber weight bears thereon, the fore part of the timber will be conveyed and will move in a direction at right angles with respect to its prior direction of movement, while the rear portion at a certain moment will reach the terminal roller 7 and therefrom will fall onto the chain 2. The timber will then rest on both chains and will move in the direction of movement of the conveyor. As shown in FIG. 3, a shoulder 6 may be provided in order to prevent the timber during its tilting movement, from gliding too for so as to fall off the conveyor. In said FIG. 3 it is further shown that the distance from the chain 1 and the terminal roller 7 must not be greater than one half of the length of the timber which is being fed, if the center of gravity thereof is assumed to be at one half of its length.

If, in fact, the half length of the timber would be less than the distance from 1 to 7 (apart from the inertia and the speed acquired by the timber when its tilting movement begins), the head of said timber would not contact the chain 1 and said timber would not assume its suitable position on the conveyor. The relative arrangement of the conveyor, of the loading platform and of the shoulder will not allow timbers to be discharged having a length too different, either greater or shorter, than a certain measure, if not provision is made for the possibility of moving the shoulder and the loading platform or the roller 7 forward or rearward in order to adjust the mutual distance to the length of the material which is being discharged.

Furthermore, it is obvious that the distance from the chain 1 to the chain 2 must be such, that the center of gravity of the piece will fall between the two chains or ropes, in order to obtain the stability of the piece itself during its transportation.

It will be evident from the above which limiting factors must be taken into account in the arrangement of the components of the conveyor according to this invention instead of being discharged from one or more stationary loading platforms, the timbers could be discharged onto the conveyor directly from railway trucks if this is advantageous. In this case the floor itself of the railway truck will constitute the loading platform and the timbers will be moved lengthwise by causing said timbers to glide on said floor or using, if the case may be light weight idle roller conveyor, to be put into operation each time. In this case of discharge from railway trucks, the railway track will be located parallel to the conveyor and at a desired calibrated distance. It will be thus possible to locate along the conveyor a number of trucks and to discharge timbers from them sequentially, without having recourse to other operations.

The timbers lying on the conveyor could be inspected, marked and if the case may be, manually turned with no difficulty if a more careful examination is necessary.

At the end of the conveyor the timbers will be stored and transported where necessary by means of lifting trucks or other apparatus or forwarded to conveyors aligned or located at any angle with respect to the conveyor according to this invention.

By way of example, in FIG. 1, the initial portion of a power operated roller conveyor has been shown, extending in the same direction as the chain conveyor. When the timber reaches the end of the chain conveyor, the head of said timber will first project beyond the terminal pulley and will fall onto the extension conveyor while the rear end of said timber will follow, and by suitable guide side walls the timber will be forwarded with its length dimension oriented in the desired direction of advancement. In FIG. 1 a power operated roller conveyor is shown in phantom line, arranged in a direction at right angles with respect to that of the chain conveyor. Likewise as disclosed, the head of the timber will fall first onto the second conveyor, whereby the timber will assume the desired direction of travel. Finally, in FIG. 2 another terminal device has been shown by way of example, consisting of a simple chute ending in chain storing equipment which stores a number of timbers adapted to be periodically removed and forwarded for use.

FIG. 4 shows an improvement also related to timbers. It may be desired after the discharge operation from the platform 4 or from the railway trucks, and during the conveyance on said conveyor, to effect a testing and sorting operation in which the pieces must separated before reaching the end of the conveyor. FIG. 4 shows any portion of the conveyor with a device suitable for the aforesaid purpose, it being understood that one or more of these devices can be located along the length of the conveyor. The device consists only of an abutment 8 which can be inserted into position manually, or by an actuating leverage, or by pneumatic actuators or by a solenoid, and the like, controlled by the tester. The abutment 8 causes, as soon as the rear end of the timber contacts said abutment, turning movement of the timber, and finally free fall of the timber between the two chains 1 and 2. In FIG. 5 it is possible to see clearly that the timber falls on a chute located below the chains, which will carry the timbers to a storage device, consisting of two moving chains which will stack the timbers against two terminal stop members wherefrom the timbers may be periodically removed and carried to their utilization destination. In FIGURE 5 an alternative system has been shown in phantom lines, consisting of a roller conveyor, extending parallel to the chains and located between and under said chains. This device in place of the chute and the storage device as described previously, allows the timbers to be forwarded lengthwise in a plane beneath the conveyor in order to be transported in the same direction of movement or in reverse direction. The device last described, allows for simultaneous discharge from two railway trucks or from two platforms without mixing of the materials coming from the two sources. It will be sufficient to this purpose to place the stop device 8 between the two discharge positions; the timbers coming from the most remote platform or truck, when reaching the abutment 8 will be deposited onto the lower conveyor, while the timbers discharged from the second truck will remain on the upper plane of the conveyor. The so travelling timbers could be, at the end of the conveyor, suitably forwarded to two independent secondary conveyors. If many selecting devices, like that shown in FIG. 4 are provided, whereby it is impractical to manually operate the abutment 8 for each device; servo-controls operating the abutments could be directly operated by means of push buttons by the tester, or also indirectly by means of memory units and magnetic tapes.

The operation of the abutments could also be, finally, directly controlled by the timbers moving on the conveyor, depending upon the position of said timbers on said conveyor. For instance, in FIG. 1 the timber 9 is moved so that its end will be in position to strike a contact 10 which by means of suitable relays and timing devices can operate the mechanism controlling the abutment 8 which will cause the timber 9 and only this timber to fall at the predetermined position.

The present invention has been illustrated and described in conjunction with preferred embodiments. It is understood, however, that numerous modifications and variations can be made thereto without departing from the scope of the invention as defined in the attached claims.

What is claimed is:

1. A conveying device for solid material of elongated shape and particular length, said device comprising first and second endless conveyor elements extending parallel to one another in spaced relation at a distance corresponding to at least half the length of the material to be conveyed, means for advancing said conveyor elements at the same speeds, means for feeding said material onto said conveyor elements transversely thereof, a shoulder projecting above a plane containing said elements in spaced relation with one of said conveyor elements for contacting material placed on said elements to limit overhang thereof and prevent falling of the conveyed material from said elements, stop means arranged adjacent the other of said elements to engage one end of the conveyed material and to cause it to fall by gravity within the free space between said endless elements, and receiving means disposed beneath said conveyor elements for receiving the conveyed material as it falls therefrom.

2. A device as claimed in claim 1, wherein said endless conveyor elements are ropes, said means for advancing said conveyor elements comprising spaced pulleys supporting each of said ropes and a motor coupled to one of said pulleys for each of said ropes for driving the same.

3. A device as claimed in claim 1, wherein said receiving means is a conveyor.

References Cited by the Examiner

UNITED STATES PATENTS

| | | |
|---|---|---|
| 1,057,829 | 4/1913 | Head. |
| 2,786,565 | 3/1957 | Eckart. |
| 3,204,753 | 9/1965 | Moseley. |

EVON C. BLUNK, *Primary Examiner.*

SAMUEL F. COLEMAN, *Examiner.*

R. S. KRISHER, *Assistant Examiner.*